US009935781B2

(12) United States Patent
Jain

(10) Patent No.: US 9,935,781 B2
(45) Date of Patent: Apr. 3, 2018

(54) MANAGING A LARGE NETWORK USING A SINGLE POINT OF CONFIGURATION

(75) Inventor: Nitin Jain, Saratoga, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 452 days.

(21) Appl. No.: 13/487,932

(22) Filed: Jun. 4, 2012

(65) Prior Publication Data

US 2013/0188521 A1  Jul. 25, 2013

Related U.S. Application Data

(60) Provisional application No. 61/589,270, filed on Jan. 20, 2012, provisional application No. 61/646,718, filed on May 14, 2012.

(51) Int. Cl.
*H04L 12/18* (2006.01)
*H04L 12/46* (2006.01)

(52) U.S. Cl.
CPC ........ *H04L 12/185* (2013.01); *H04L 12/4641* (2013.01)

(58) Field of Classification Search
CPC ................ H04L 12/185; H04L 12/4641
See application file for complete search history.

(56) References Cited

U.S. PATENT DOCUMENTS

| | | | | |
|---|---|---|---|---|
| 6,785,294 | B1* | 8/2004 | Ammitzbø, II et al. | 370/467 |
| 6,788,692 | B1* | 9/2004 | Boudreau et al. | 370/400 |
| 2002/0133622 | A1* | 9/2002 | Pinto | 709/242 |
| 2004/0081104 | A1* | 4/2004 | Pan et al. | 370/254 |
| 2005/0027862 | A1* | 2/2005 | Nguyen et al. | 709/225 |
| 2006/0198331 | A1* | 9/2006 | Gurin | 370/313 |
| 2007/0233825 | A1* | 10/2007 | Brownell et al. | 709/220 |
| 2011/0258519 | A1* | 10/2011 | Laevens et al. | 714/776 |
| 2011/0261699 | A1* | 10/2011 | Nishida | 370/241 |
| 2012/0271895 | A1* | 10/2012 | Maenpaa et al. | 709/206 |
| 2013/0007335 | A1* | 1/2013 | Jiang et al. | 710/316 |
| 2013/0060940 | A1* | 3/2013 | Koponen et al. | 709/225 |

* cited by examiner

*Primary Examiner* — Walter Divito
(74) *Attorney, Agent, or Firm* — Shun Yao; Park, Vaughan, Fleming & Dowler LLP

(57) ABSTRACT

One embodiment of the present invention provides a computing system. The switch includes a discovery module, a device management module, and a logical group management module. The discovery module constructs a multicast query message for a first multicast group to which the computing system is registered. The device management module extracts information about a remote switch from a query response message from the remote switch and constructs a client database, wherein a first entry in the client database contains the information extracted from the query response message. The logical group management module associates the remote switch with a second multicast group.

28 Claims, 17 Drawing Sheets

MANAGING A LARGE NETWORK USING A SINGLE POINT OF CONFIGURATION

RELATED APPLICATIONS

This application claims the benefit of U.S. Provisional Application No. 61/589,270, titled "Method of Managing a Large Network of Switches using Single IP Address," by inventor Nitin Jain, filed 20 Jan. 2012, the disclosure of which is incorporated by reference herein. This application claims the benefit of U.S. Provisional Application No. 61/646,718, titled "Managing a Large Network Using a Single Point of Configuration," by inventor Nitin Jain, filed 14 May 2012, the disclosure of which is incorporated by reference herein.

BACKGROUND

Field

The present disclosure relates to network management. More specifically, the present disclosure relates to a method and system for efficiently managing a plurality of switches using a single point of configuration.

Related Art

The growth of the Internet has brought with it an increasing demand for bandwidth. As a result, equipment vendors race to build larger and faster switches, each capable of supporting a large number of end devices, to move more traffic efficiently. However, the size of a switch cannot grow infinitely. It is limited by physical space, power consumption, and design complexity, to name a few factors. One way to meet this challenge is to interconnect a number of switches to support a large number of users. Managing such a large number of switches requires tedious and complex configurations on a respective switch, typically performed by a network administrator. Such configuration includes configuring interfaces on a respective switch and routing policies for the switch.

A large number of switches can be managed together by interconnecting these switches. Typically, a respective switch discovers the other interconnected switches to obtain a local view of the topology of these switches. A discovery method on a switch usually sends discovery messages via all local interfaces (can be referred to as "flooding") to discover the topology. All other switches in the network send a response back. Upon receiving the responses, the method discovers the switches and their topology. To consolidate the discovery process, one switch can discover the topology and share that information with the rest of the switches. However, the switch still floods the network to discover the topology. Furthermore, the switch typically employs unicast-based message exchanges to share any information with another switch. These messages are essentially part of the control traffic and do not contribute to the data traffic among the switches while taking up significant bandwidth from the interconnecting links. As a result, network management through such messages is inefficient.

While managing a network together brings many desirable features to a network, some issues remain unsolved for efficient network management and configuration.

SUMMARY

One embodiment of the present invention provides a computing system. The computing system includes a discovery module, a device management module, and a logical group management module. The discovery module constructs a multicast query message for a first multicast group to which the computing system is registered. The device management module extracts information about a remote switch from a query response message from the remote switch and constructs a client database, wherein a first entry in the client database contains the information extracted from the query response message. The logical group management module associates the remote switch with a second multicast group.

In a variation on this embodiment, the discovery module also constructs an instruction message instructing a local switch to construct the multicast query message.

In a variation on this embodiment, at least one interface of the computing system and at least one interface of the remote switch are configured with a virtual local area network (VLAN) identifier. Furthermore, a respective member of the VLAN is registered to the first multicast group.

In a variation on this embodiment, the computing system also includes an identifier management module which assigns a unique identifier to the remote switch.

In a further variation on this embodiment, the unique identifier is an Internet Protocol (IP) address, wherein the IP address is internal to a network to which the computing system and the remote switch are coupled.

In a variation on this embodiment, the computing system also includes a command management module which constructs a message containing a command to be executed on the remote switch.

In a further variation on this embodiment, the command is in a type-length-value (TLV) format.

In a variation on this embodiment, the computing system also includes a configuration module which creates a switch configuration for the remote switch and constructs a multicast data message for the second multicast group, wherein the multicast data message contains at least a portion of the switch configuration.

In a further variation on this embodiment, the switch configuration is a switch image, wherein the switch image specifies operations and forwarding policies for the remote switch.

In a further variation on this embodiment, the configuration module also constructs a unicast message for the remote switch in response to identifying a negative acknowledgment message corresponding to the multicast data message.

In a variation on this embodiment, the computing system also includes a license management module which constructs a message containing license information for the remote switch.

One embodiment of the present invention provides a switch. The switch includes a packet processor, a discovery module, and a command management module. The packet processor extracts the content of a message from a remote switch. The discovery module constructs a multicast query response message for a first multicast group in response to the extracted content being a multicast query. The command management module locally executes a command received in the switch, wherein the extracted content contains the command.

In a variation on this embodiment, the switch also includes an identifier management module which assigns a unique identifier to the switch, wherein the extracted content contains the unique identifier.

In a variation on this embodiment, the switch also includes a switch configuration module which configures the switch based on a switch configuration, wherein the extracted content contains the switch configuration.

In a further variation on this embodiment, the switch configuration is a switch image, wherein the switch image specifies operations and forwarding policies for the switch.

In a variation on this embodiment, the switch also includes a data acknowledgment module which constructs a unicast message for the remote switch, wherein the message contains a negative acknowledgment corresponding to one or more missing messages from the remote switch.

DETAILED DESCRIPTION

Figure 1A:
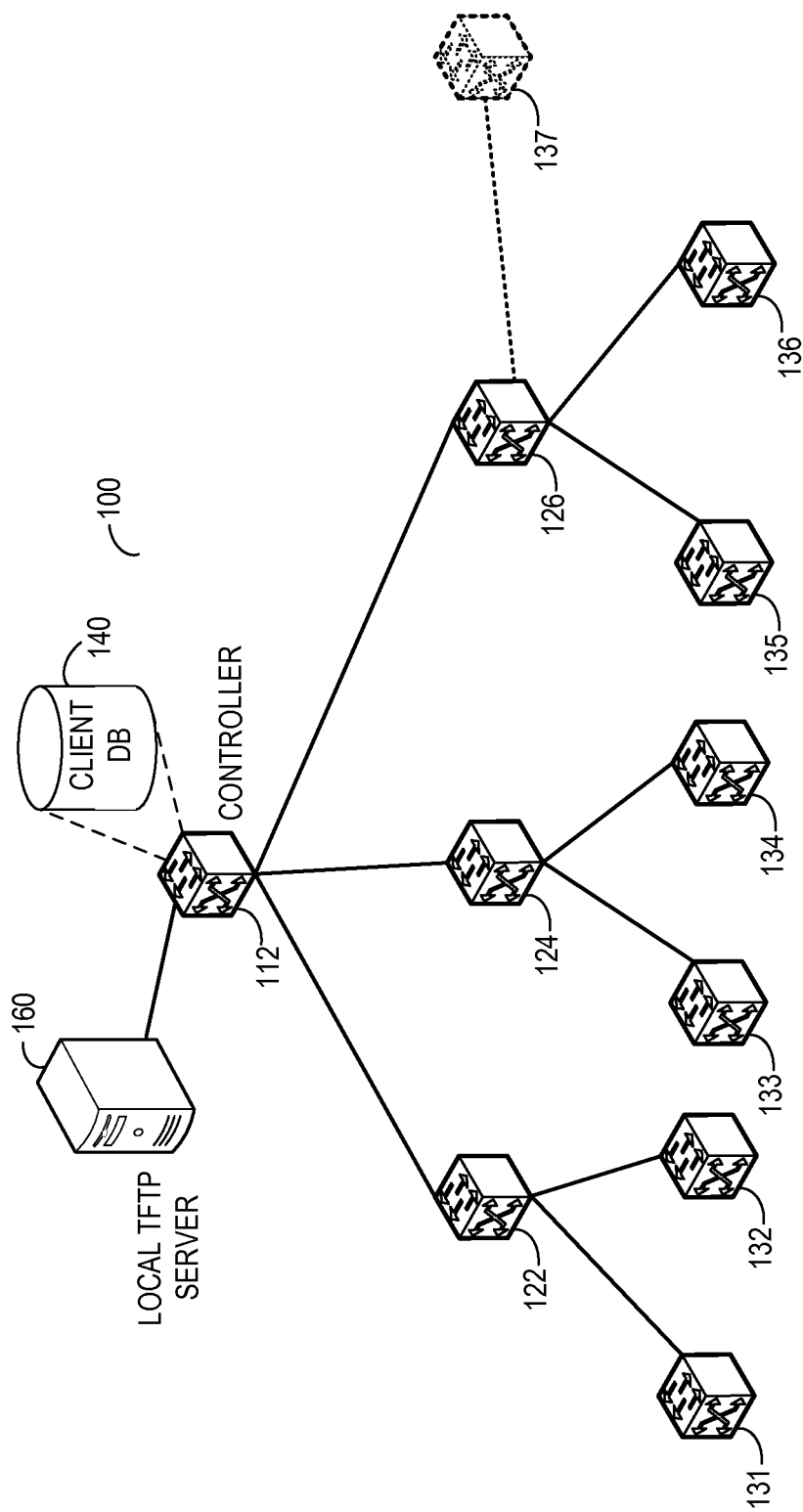
FIG. 1A illustrates an exemplary layer-2 network with a controller as a single point of configuration, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently managing a network is solved by configuring a plurality of switches from a single point using native multicast. Managing a network typically requires configuring a respective switch of the network. Configuring every switch can be a tedious burden on the network administrator. Furthermore, if any misconfiguration occurs, the network administrator has to reconfigure every switch. Interconnecting these switches and managing them together can ease the burden on the network administrator. Typically, in order to manage these interconnected switches, a respective switch discovers the topology of these switches by flooding unicast-based discovery messages. All other switches send back a unicast-based response. These switches share information among themselves based on unicast messages as well. Consequently, the traffic caused by such message exchanges increases proportionally with the number of switches and links in the network. Such a large volume of traffic for managing a network is inefficient, and for a large network, can become infeasible.

To solve this problem, a controller, which can be a switch in a network, can remotely discover, configure, and manage a plurality of switches interconnected in a network using the native multicast features of these switches. The controller provides a network administrator a single point of configuration to these switches. Furthermore, the controller reduces the control traffic and the number of message exchanges by using the native multicast features for remote switch management. To enable the controller to manage the switches, all switches in the network can have a basic switch image. The switch image can be configured with a registration to a default all-switch multicast group. In some embodiments, at least one interface of a respective switch has a membership in a default virtual local area network (VLAN). As a result, a respective switch with a membership in the VLAN receives the messages sent to this default multicast group. To initiate the discovery process, the controller sends a group-specific discovery message to the group. This discovery message can be a multicast query message. A respective switch receives the message and sends a multicast response message to the controller. The data in the message (can be referred to as the "payload") contains switch-specific discovery information. Such information can include a switch identifier, the device type, the capability, the current image, etc. In some embodiments, the query message and the query response message can be Internet Group Management Protocol (IGMP) messages.

In some embodiments, a network can have multiple controllers, and a respective controller manages at least a subset of switches in the network. If a switch is managed by multiple controllers, the switch sends a query response to a respective controller. In this way, a respective controller discovers the switches that it manages within the network. The query response also includes a hop-count value, indicating the number of hops between a respective switch and the controller. A respective intermediate switch increments the hop-count value to represent the number of hops the response message has taken from the originating switch. The controller maintains a client database which contains information for a respective switch. Upon receiving a query response, the controller extracts the discovery information from the payload and stores the information in the client database. In addition, the controller assigns a unique identifier to a respective switch. This identifier is specific to a network and unique within the network. In some embodiments, the controller uses the media access control (MAC) address of the switch to create the unique identifier. For example, a part of the identifier can be the MAC address In some embodiments, the controller periodically updates the client database. This update involves the aging-out of stale entries and refreshing the rest of the entries. The controller can periodically send a discovery message as a multicast query to the network to update the client database. A respective switch receives this message and sends a query response to the controller. If any switch-specific discovery information has been updated, the controller updates the corresponding information in the client database. If a switch does not send a response for a period of time, the controller ages-out the entry in the client database. When a new switch joins the network, the switch is already configured with the default multicast group. Consequently, the switch receives this discovery message and sends a response with the discovery information. In this way, the controller quickly discovers a new switch joining the network after the initial discovery process.

Although the present disclosure is presented using examples based on the layer-2 communication protocol, embodiments of the present invention are not limited to layer-2 networks. Embodiments of the present invention are relevant to any networking protocol which requires a loop-free network topology. In this disclosure, the term "layer-2 network" is used in a generic sense, and can refer to any networking layer, sub-layer, or a combination of networking layers below layer-3 (e.g., the network layer in the Internet protocol stack).

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a host machine, a conventional layer-2 switch, or any other type of network device. Additionally, an end device can be coupled to other switches or hosts further away from a layer-2 network. An end device can also be an aggregation point for a number of network devices to enter the layer-2 network.

The terms "interface" and "port" are used interchangeably. The term "TRILL interface" refers to an interface which sends/receives data frames encapsulated with a TRILL header and outer MAC header.

The term "switch identifier" refers to a group of bits that can be used to identify a switch. If a switch is an RBridge, the switch identifier can be referred to as an "RBridge identifier." Note that the TRILL standard uses "RBridge ID" to denote a 48-bit intermediate-system-to-intermediate-system (IS-IS) system ID assigned to an RBridge, and "RBridge nickname" to denote a 16-bit value that serves as an abbreviation for the "RBridge ID." In this disclosure, "switch identifier" is used as a generic term and not limited to any bit format, and can refer to any format that can identify a switch. The term "RBridge identifier" is also used in a generic sense and not limited to any bit format, and can refer to "RBridge ID," "RBridge nickname," or any other format that can identify an RBridge.

In this disclosure, the terms "switch" and "router" are used interchangeably, and refer to any device forwarding traffic in a network. The terms should not be interpreted as being limited to a layer-2 or layer-3 network. The term "node" is used in a generic sense and can refer to a switch or a router.

The term "image" refers to data stored in a nonvolatile and distributable form which represents the contents of a computing device or software controlling the computing device (e.g., an operating system). In this disclosure, any data or software that can operate a network switch or router and can be distributed across a network can be referred to as an image. The image can simply be one or more files that can contain an operating system, executable programs, and any data files that might be related to the operating system and programs.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "Ethernet fabric switch" refers to a number of interconnected physical switches which form a single, scalable logical switch. In a fabric switch, any number of switches can be connected in an arbitrary topology, and the entire group of switches can function together as one single, logical switch. This feature makes it possible to use many smaller, inexpensive switches to construct a large fabric switch, which can be viewed as a single logical switch externally.

Network Architecture

FIG. 1A illustrates an exemplary layer-2 network with a controller as a single point of configuration, in accordance with an embodiment of the present invention. As illustrated in FIG. 1, a layer-2 network 100 has switches 122, 124, 126, 131, 132, 133, 134, 135, and 136. Also included in network 100 is a controller 112 which manages and configures the switches in network 100. Controller 112 can be a switch as well. Controller 112 has a controller image configured to manage network 100. A respective switch in network 100 has a basic switch image configured with a registration to a default all-switch multicast group. In some embodiments, at least one interface of a respective switch in network 100 has a membership to a default VLAN. As a result, a respective switch in network 100 has a membership to the VLAN and is registered to this default multicast group. In this example, switches in network 100 are coupled to each other in a tree (i.e., in a loop-free layer-2 connectivity). Any multicast message sent from controller 112 is distributed along the tree. In some embodiments, network 100 is a TRILL network and switches in network 100 are TRILL RBridges.

During operation, controller 112 initiates the discovery process by sending a discovery message as a multicast query to the group. Controller 112 can send this multicast query for switches with membership in the default VLAN. Because all switches in network 100 are registered to the default multicast group and, optionally, have a membership in the default VLAN, a respective switch in network 100 receives this multicast message. For example, when controller 112 sends the message, switch 122 receives the message and sends a multicast response message to controller 112. The response message contains discovery information, such as an identifier of switch 122 (e.g., the MAC address of switch 122), device type (e.g., a regular switch or a controller), capability, current image (e.g., the basic image), hop count (e.g., the number of hops between switch 122 and controller 112), etc. Because it is a multicast message, switch 122 then forwards the message to switches 131 and 132. Switches 131 and 132, in turn, send respective multicast response messages containing their respective discovery information to controller 112 via switch 122. Note that when a switch responds to a multicast query message, the response is typically sent via multicast, and upon recognizing the response message, all other switches in the sub-network usually refrain from sending a response message (referred to as suppressing) to avoid flooding. However, because switches 122, 131, and 132 are interconnected in a tree structure, these switches don't suppress their responses, as described in U.S. Pat. No. 7,877,508, titled "Method and system for intelligently forwarding multicast packets," by inventor Nitin Jain, the disclosure of which is incorporated by reference herein. Switch 122 increments the hop-count value of the response messages from switches 131 and 132 to represent the number of hops these response messages have taken from switches 131 and 132 to controller 112. In the same way, switches 124, 133, 134, 126, 135, and 136 receive the multicast discovery message and send respective multicast response messages to controller 112.

Controller 112 maintains a client database 140 which contains information for a respective switch in network 100. Upon receiving the query response message from switch 122, controller 112 extracts the discovery information about switch 122 from the message and stores the information in client database 140. Controller 112 also assigns a unique identifier to switch 122. This identifier can be specific to network 100. In some embodiments, controller 112 uses the MAC address of switch 122 to create the unique identifier.

Controller 112 can periodically update client database 140 to age-out stale entries and refresh the rest of the entries. Controller 112 can periodically send the discovery message as a multicast query to network 100 to update client database 140. Switch 122 and all other switches in network 100 receive this update message and send a query response to controller 112. If a new switch joins network 100, the switch receives this periodic discovery message and sends a response. For example, when a new switch 137 joins network 100 (represented by dotted lines), switch 137 receives the periodic discovery message and sends a response to controller 112. Upon receiving the response, controller assigns a unique identifier to switch 137. In this way, controller 112 quickly discovers new switch 137 joining network 100 after the initial discovery process. In some embodiments, controller 112 can be coupled to a local Trivial File Transfer Protocol (TFTP) server 160. Controller 112 can store switch-specific files, such as a switch image or a license file for a switch in TFTP server 160. In this way, controller 112 does not need to store such files in local memory.

Figure 1B:
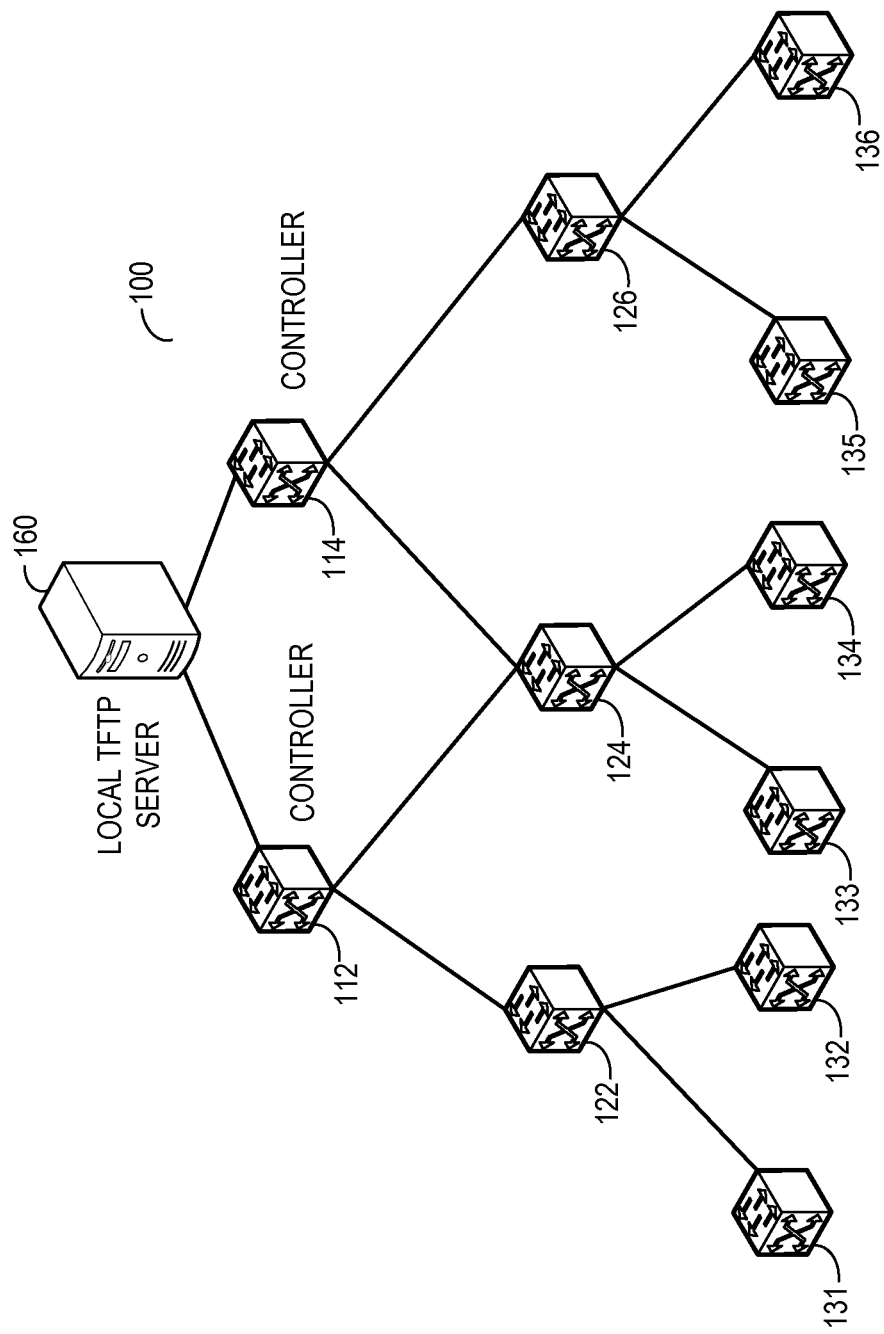
FIG. 1B illustrates an exemplary layer-2 network with multiple controllers, in accordance with an embodiment of the present invention.

In some embodiments, network 100 can have multiple controllers. FIG. 1B illustrates an exemplary layer-2 network with multiple controllers, in accordance with an embodiment of the present invention. The same numerals in FIG. 1A are used to denote the components in FIG. 1B. In this example, network 100 has another controller 114. The switches in network 100 receive discovery messages as multicast queries from controllers 112 and 114, and send query responses to both controllers with their discovery information. In this way, both controllers 112 and 114 discover the switches and presence of another controller based on the device type information, as described in conjunction with FIG. 1A. In some embodiments, controller 112 actively manages network 100 while controller 114 remains on standby. Because both controllers send periodic discovery messages, both controllers have updated client databases. If controller 112 becomes unavailable, controller 114 takes over and starts managing network 100 using the local client database. Note that controllers 112 and 114 both can store switch-specific files in TFTP server 160. In this way, both controllers 112 and 114 can use a single TFTP server 160 for storing and accessing the switch-specific files.

Discovery Process

Figure 2A:
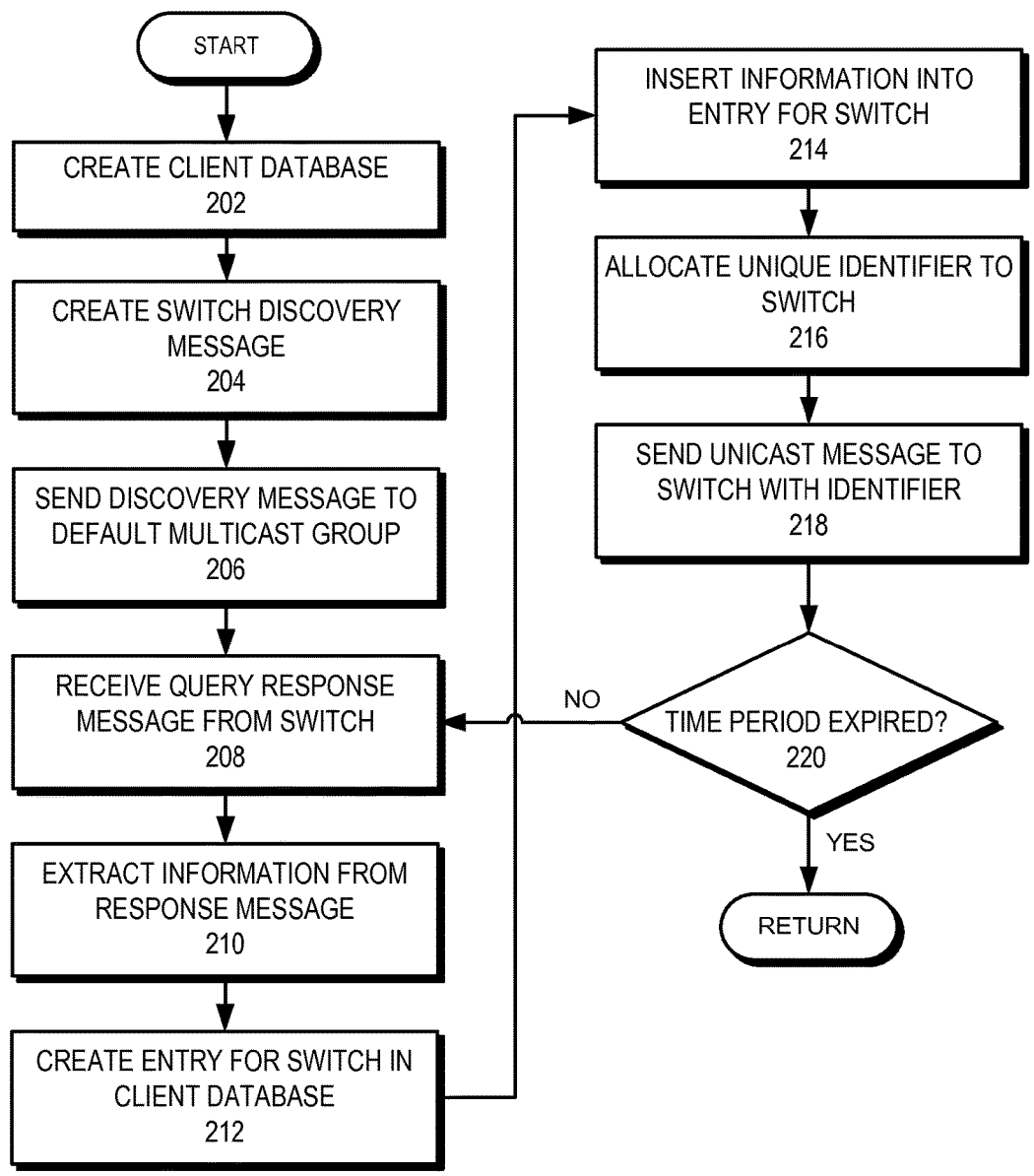
FIG. 2A presents a flowchart illustrating the process of a controller discovering a network topology, in accordance with an embodiment of the present invention.

FIG. 2A presents a flowchart illustrating the process of a controller discovering a network topology, in accordance with an embodiment of the present invention. The controller first creates a client database (operation 202) for storing switch-specific discovery information. The controller then creates a switch discovery message (operation 204) as a multicast query message and sends the message to the default multicast group of the network the controller is managing (operation 206). The controller optionally can make this message specific to the members of a default VLAN. In some embodiments, the discovery message is distributed as a layer-2 multicast message. The controller receives the query response message from a respective switch in the network (operation 208) and extracts the discovery information from the response message (operation 210). This query message and the corresponding query response message can be IGMP messages.

Next, the controller creates an entry in the client database for the switch from which the controller has received the response (operation 212) and inserts the extracted information into the entry (operation 214). The controller then assigns a unique identifier to the switch (operation 216) and sends a unicast message with the identifier (operation 218). In some embodiments, this identifier can be an IP address. This IP address can be internal to the network and typically used for the controller to send data to the switch. The controller can use the MAC address of the switch to create the unique identifier. For example, the MAC address can be a part of the identifier. The controller then checks whether the time period for the controller to receive responses from the switches has expired (operation 220). The controller receives responses from the switches within a predefined period of time. Note that the controller performs the discovery process periodically. Such periodic discovery process is further described in conjunction with FIG. 2B.

Figure 2B:
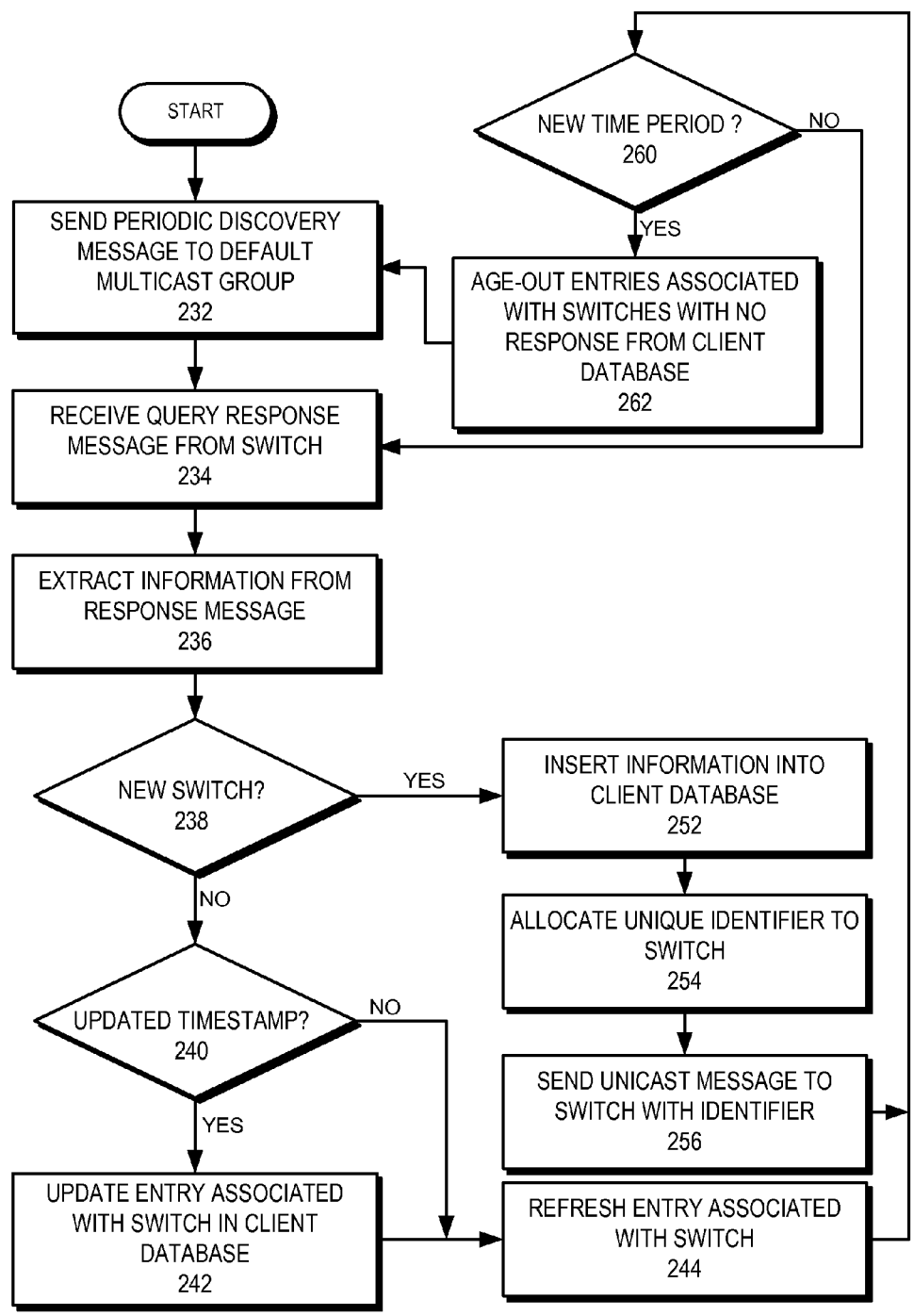
FIG. 2B presents a flowchart illustrating the process of a controller refreshing and aging-out a network topology, in accordance with an embodiment of the present invention.

FIG. 2B presents a flowchart illustrating the process of a controller refreshing and aging-out a network topology, in accordance with an embodiment of the present invention. The controller performs this process periodically. At the beginning of each such time period, the controller sends a discovery message as a multicast query to the default multicast group (operation 232). The controller then receives a query response message from a switch (operation 234) and extracts the discovery information from the response message (operation 236). The controller checks whether the message is from a new switch (operation 238). If so, the controller inserts the information into the client database (operation 252), allocates a unique identifier to the switch (operation 254), and send the identifier via a unicast message to the switch (operation 256), as described in conjunction with FIG. 2A.

If the switch is not a new switch, then the controller checks whether the timestamp (i.e., age) of the switch has been updated (operation 240). The controller can check this by comparing the extracted information about the switch with the information in the entry in the client database associated with the switch. If the extracted information is updated, the controller updates the entry associated with the switch in the client database based on the extracted information (operation 242). If the extracted information is not updated (operation 240) or the entry associated with the switch has been updated (operation 242), the controller refreshes the entry associated with the switch (operation 244). This operation ensures that the entry is not aged-out after the current time period. The controller then checks whether it is a new time period (operation 260) by checking a timer. If not, the controller continues to receive query responses from other switches in the network (operation 234). Otherwise, the controller ages-out (i.e., removes) the entries associated with switches with no response from the client database (operation 262) and sends the discovery message for the next time period (operation 232). Note that the controller can age-out an entry after not receiving any response from the corresponding switch for multiple time periods.

Figure 2C:
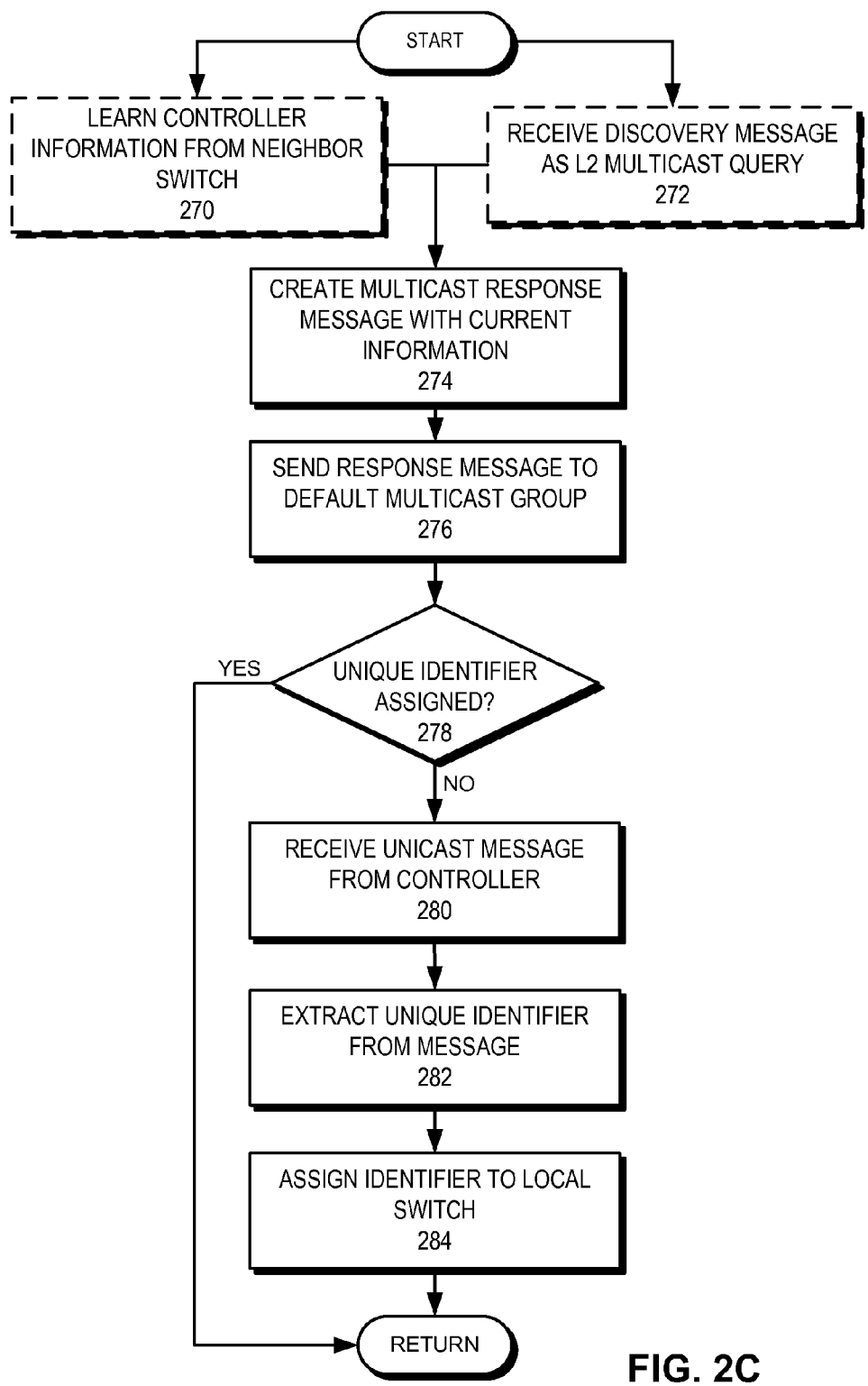
FIG. 2C presents a flowchart illustrating the process of a switch being discovered, in accordance with an embodiment of the present invention.

During this discovery process (which can be referred to as the discovery phase), a respective switch in the network communicates with the controller to ensure a successful discovery by the controller. FIG. 2C presents a flowchart illustrating the process of a switch being discovered, in accordance with an embodiment of the present invention. The switch can either learn controller information from a neighbor switch (operation 270) or by receiving a discovery message as a layer-2 multicast query from a controller (operation 272). After learning about the controller, the switch creates a multicast response message with current discovery information (operation 274). The switch sends this response message to default multicast group (operation 276).

The switch then checks whether a unique identifier has been assigned to the switch (operation 278). If so, then the discovery message is a periodic message and the switch has already been discovered. Otherwise, the switch receives a unicast message from the controller containing the unique identifier (operation 280). The switch extracts the unique identifier from the message (operation 282) and assigns the identifier to the switch (operation 284). In some embodiments, this identifier can be an IP address. This IP address can be internal to the network and typically used for the controller to send data to the switch. Note that once the IP addresses are assigned, existing management tools such as Telnet and/or Secure Shell (SSH) can be used to manage a respective switch using unicast.

Discovery for Layer-3

Figure 3A:
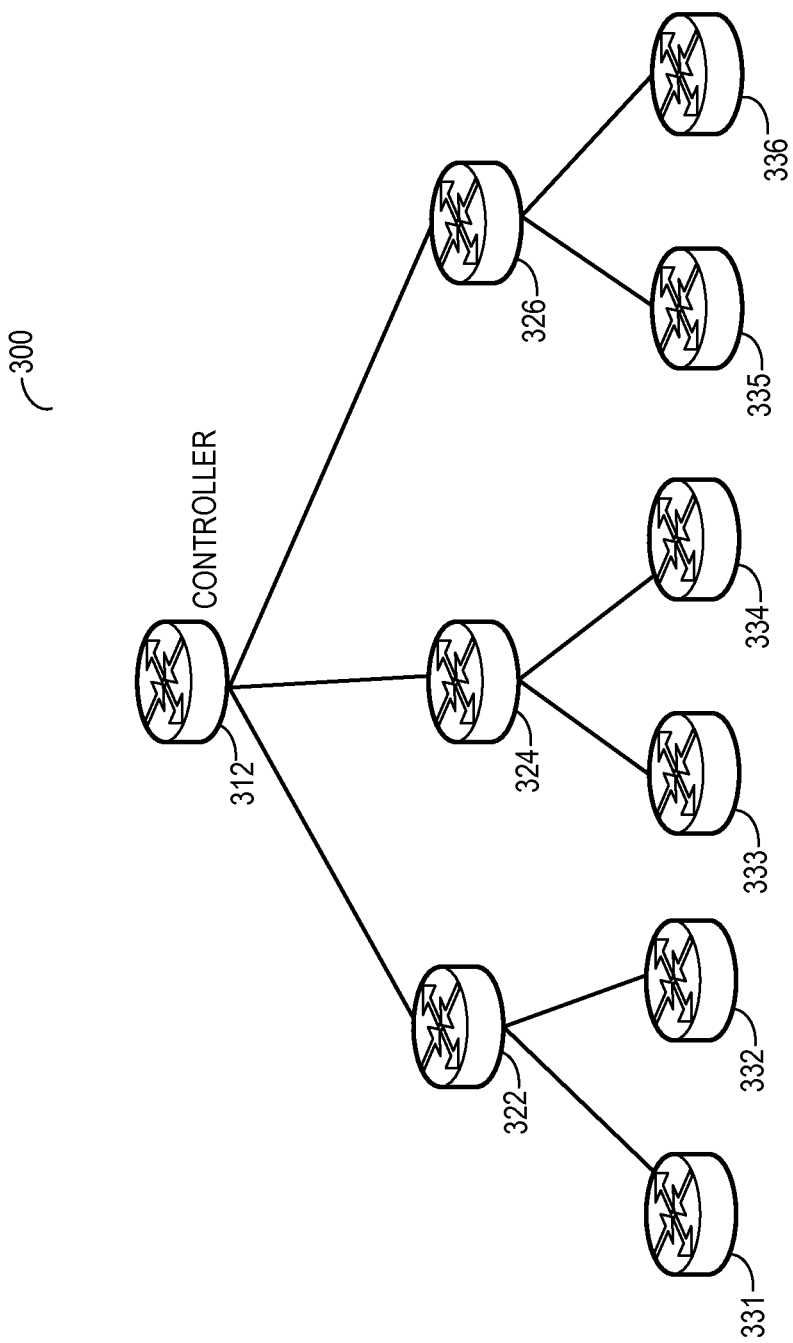
FIG. 3A illustrates an exemplary layer-3 network with a controller as a single point of configuration, in accordance with an embodiment of the present invention.

The switches in a network can be interconnected based on layer-3 protocols. Managing and provisioning a layer-3 network (e.g., an IP network) is complex because a respective layer-3 networking device (e.g., a router) requires individual configurations, such as an address assignment for a respective interface in the device, and routing protocol selection and configuration. FIG. 3A illustrates an exemplary layer-3 network with a controller as a single point of configuration, in accordance with an embodiment of the present invention. A layer-3 network 300 includes a controller 312 which can be a layer-3 networking device. Also included in network 300 are layer-3 networking devices (can be referred to as routers) 322, 324, 326, 331, 332, 333, 334, 335, and 336. Because the interconnection is based on layer-3 protocols, a respective interface is configured with a layer-3 network address (e.g., an IP address).

In this example, a network administrator configures a respective router in network 300 with an IP address. Controller 312 discovers a respective router based on local information and/or discovery protocols. Such local information and discovery protocol can include, but not limited to, Simple Network Management Protocol (SNMP) query, subnet probing, Address Resolution Protocol (ARP) table, routing table, Foundry Discovery Protocol (FDP), Cisco Discovery Protocol (CDP), etc. For example, controller 312 can check its local forwarding table and discovery a next-hop router 322. Once controller 312 learns the IP address of a respective router in network 300 through this discovery process, controller 312 can manage a respective router in network 300.

The network administrator of network 300 configures the default multicast group and IP address of controller 312 in a respective router in network 300. In some embodiments, controller 312 uses Source-specific Multicast (SSM) protocol for distributing information to the multicast group. A respective router, such as router 332, sends a join message to controller 312 upon receiving a request to join the multicast group. In some embodiments, this join message is a Protocol-Independent Multicast (PIM) message. The forwarding state for router 332 is established at each hop on its path to controller 312. Consequently, router 322 establishes the forwarding state for router 332. The payload of the join message contains discovery information about router 332. Upon receiving the discovery information, controller can send commands to configure router 332. Similarly, routers 322, 324, 326, 331, 333, 334, 335, and 336 send join messages to controller 312 when they receive a request to join the multicast group.

Figure 3B:
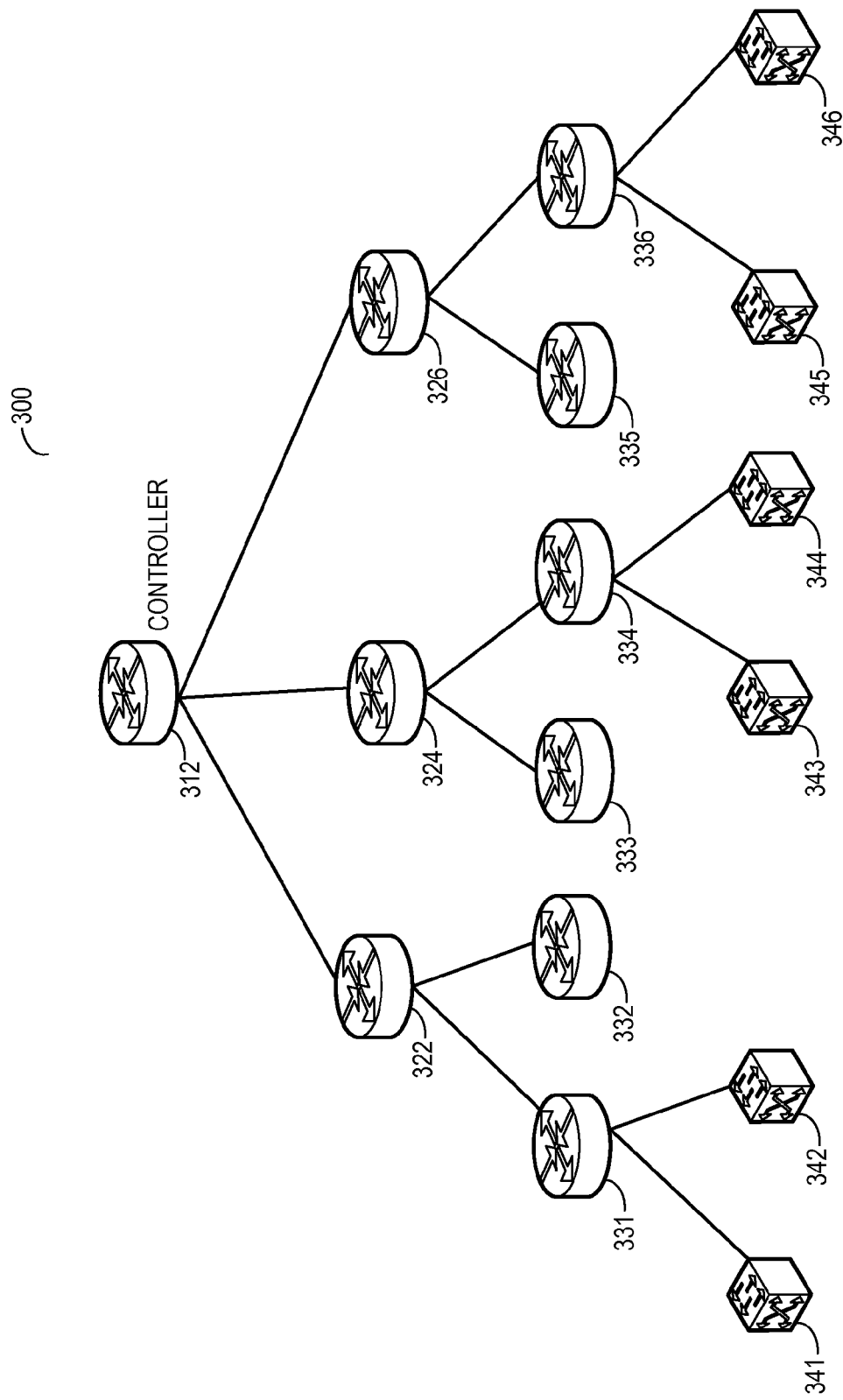
FIG. 3B illustrates an exemplary layer-2 and layer-3 hybrid network with a controller as a single point of configuration, in accordance with an embodiment of the present invention.

In some embodiments, network 300 can also have layer-2 switches. FIG. 3B illustrates an exemplary layer-2 and layer-3 hybrid network with a controller as a single point of configuration, in accordance with an embodiment of the present invention. In this example, network 300 also includes layer-2 switches 341, 342, 343, 344, 345, and 346. All routers in FIG. 3B are the same as in FIG. 3A, so the same numerals are used to denote them. In hybrid network 300, router 331 sends multicast query message to layer-2 switches 341 and 342. Switches 341 and 342 send query response to router 331 with discovery information. In some embodiments, switches 341 and 342 use IGMP protocol to communicate to router 331. Router 331 keeps track of the multicast group membership information and forwards any messages from controller 312 to switches 341 and 342. Upon receiving IGMP messages, router 331 sends join messages to controller 312 with discovery information of switches 341 and 342. This way, a respective switch and router communicates with controller 312 in network 300. Upon discovering switches 341 and 342, controller 312 can use unicast and multicast to reach these switches. For unicast communication, controller 312 can use IP addresses assigned to switches 341 and 342, as described in conjunction with FIGS. 2A and 2C. For multicast, controller 312 sends data to the layer-3 routers, such as router 331. Router 331, in turn, forwards the data to switches 341 and 342 using layer-2 multicast.

Controller Commands Using Logical Groups

Figure 4:
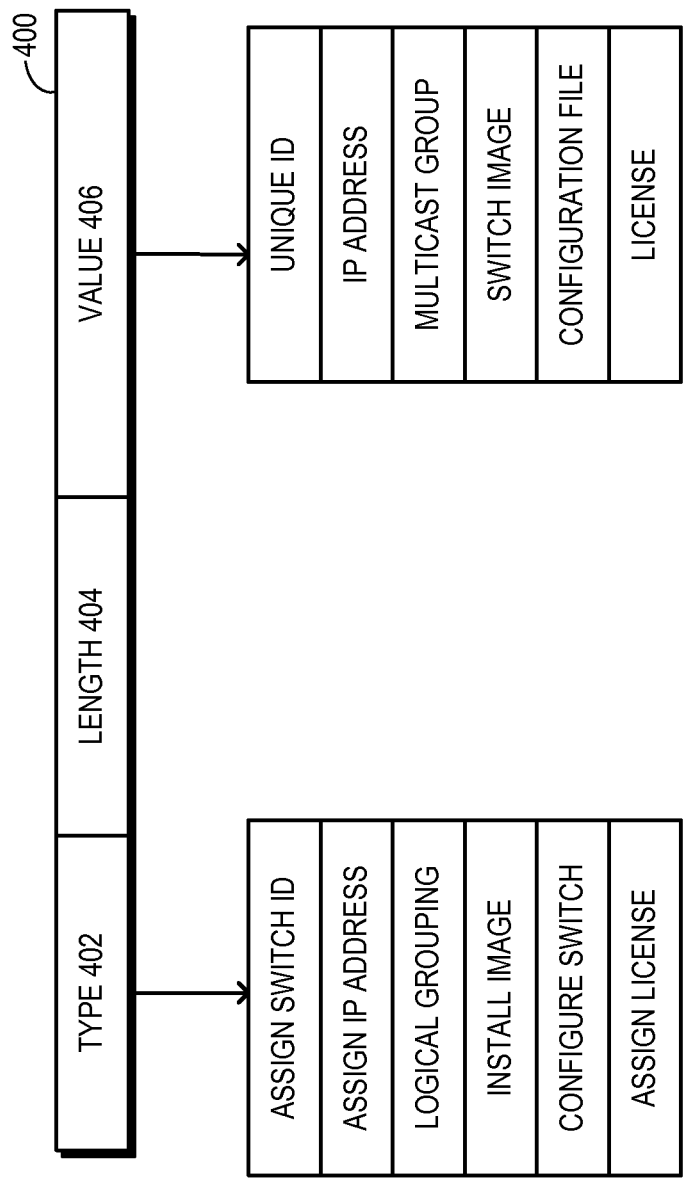
FIG. 4 illustrates an exemplary command from a controller in a type-length-value (TLV) format, in accordance with an embodiment of the present invention.

To manage and configure the switches in a network, a controller sends messages containing commands for one or more target switches in a network. A respective target switch receives the message, extracts the command, and executes the command. FIG. 4 illustrates an exemplary command from a controller in a type-length-value (TLV) format, in accordance with an embodiment of the present invention. Command 400 has a type 402 which is a value indicating the type of command 400. Usually the values for type 402 are known to the controller and the switches of a network. Such values can be preconfigured in the basic switch image. Because the length of command can be variable, length 404 indicates the length of the command. Value 406 contains any data associated with type 402. For example, if type 402 instructs the receiving switch to assign a unique identifier or an IP address to the switch, the corresponding value 406 in TLV message 400 contains the unique identifier or the IP address, respectively. Similarly, if type 402 indicates a new switch image or a configuration for a switch, value 406 contains the corresponding switch image or configuration, respectively; if type 402 indicates a new license for a switch, value 406 contains the corresponding license; and if type 402 indicates a new logical group membership for a switch, value 406 contains the corresponding logical group information (e.g., a corresponding multicast group). Note that the exemplary types described in conjunction with FIG. 4 are not exhaustive.

Figure 5A:
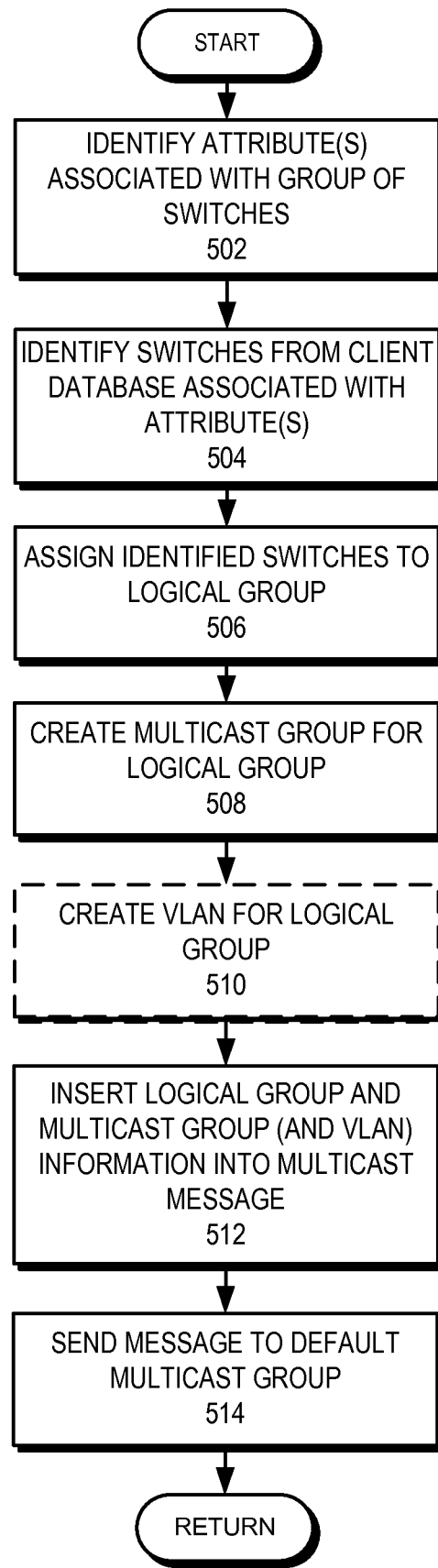
FIG. 5A presents a flowchart illustrating the process of a controller creating a logical group, in accordance with an embodiment of the present invention.

A controller can improve the efficiency of distributing these commands by utilizing the native multicast features. If the controller identifies a group of switches in a network that has the same attributes, the controller can group these switches into a logical group. The controller can create a multicast group (and optionally a VLAN) which represents a respective logical group. To create such a group, a controller can set type 402 to indicate a logical grouping and value 406 to contain the multicast group and VLAN information. FIG. 5A presents a flowchart illustrating the process of a controller creating a logical group, in accordance with an embodiment of the present invention. The controller first identifies one or more attributes associated with a group of switches (operation 502).

The controller then identifies switches associated with the attributes from the client database (operation 504). The controller expects these identified switches to execute the command. Hence, the controller assigns these switches to a logical group (operation 506). The controller then creates a multicast group for the logical group (operation 508) and, optionally, creates a VLAN for the logical group (operation 510). The controller can store logical group information in the client database. The controller inserts the multicast group and, optionally, the VLAN, information into a multicast message (operation 512), and sends the message to the default multicast group (operation 514). The multicast message can be a TLV message, as described in conjunction with FIG. 4. The controller can set type 402 of the TLV message to indicate a new logical group. The controller inserts the logical group and corresponding multicast (and VLAN) information into type 402 of the TLV message. Note that the controller sends the logical group information to all switches because the switches in the logical group have not registered with the multicast group yet. All subsequent commands for the logical group can be sent for the multicast group of the logical group.

Figure 5B:
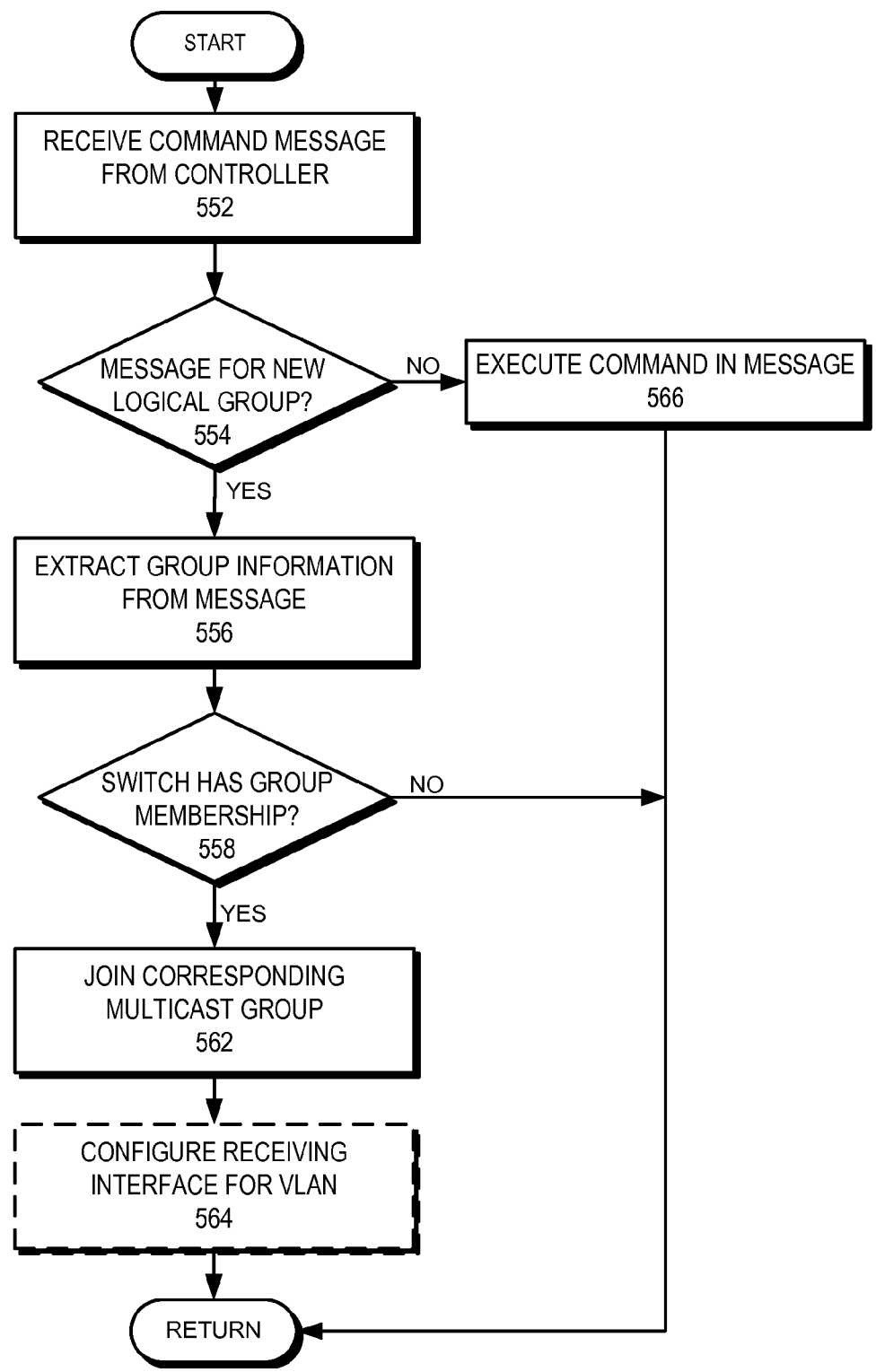
FIG. 5B presents a flowchart illustrating the process of a switch joining a logical group, in accordance with an embodiment of the present invention.

FIG. 5B presents a flowchart illustrating the process of a switch joining a logical group, in accordance with an embodiment of the present invention. Upon receiving a command message from the controller (operation 552), the switch checks whether the message is for a new logical group (operation 554). The command in the message can be in a TLV format. The switch can check the type field of the TLV command to check whether the message is for a new logical group, as described in conjunction with FIG. 4. The switch extracts the group information from the message (operation 556) and examines the information to check whether the switch has a membership in the group (operation 558). The switch can extract the group information from the value field of the TLV command. If the switch has a membership in the group, the switch joins the corresponding multicast group (operation 562), and, optionally, configures the interface through which the message has been received for the corresponding VLAN (operation 564). If the message is not for a new logical group, the switch executes the command in the message (operation 566) as indicated by the type field of the TLV command. A switch's execution of a command is further discussed in conjunction with FIG. 6B.

Command Execution

Figure 6A:
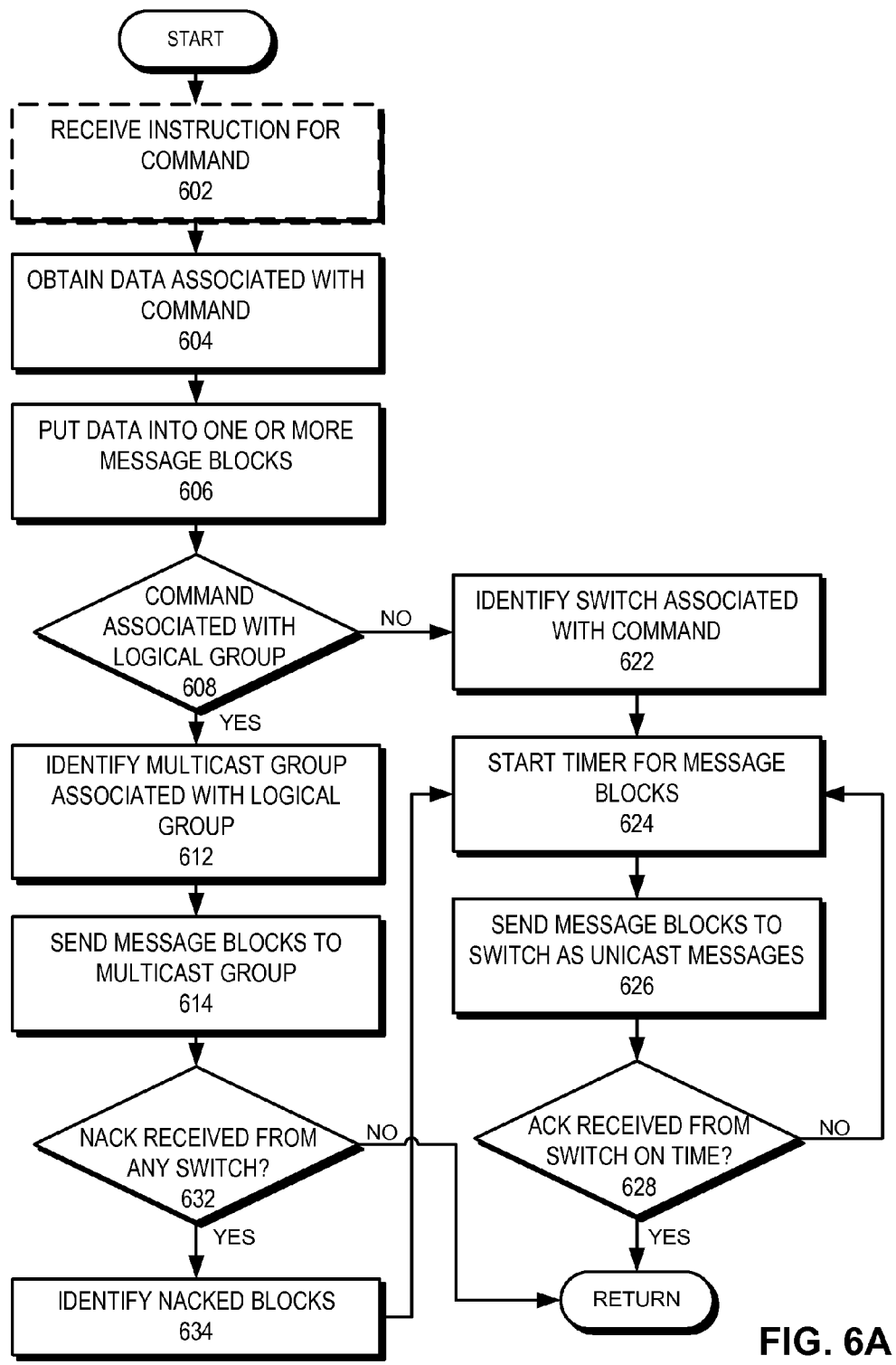
FIG. 6A presents a flowchart illustrating the process of a controller sending a command message, in accordance with an embodiment of the present invention.

A controller can send a command message to a switch for execution. Such command can include, but is not limited to, assigning an identifier, assigning an IP address, installing a switch image, installing and updating a license, etc. The controller can have a local Dynamic Host Configuration Protocol (DHCP) server which assigns an IP address to a discovered switch. The controller can also be coupled to a TFTP server which can send a switch image or a license to the switch. The TFTP protocol is described in IETF RFC "The TFTP Protocol: Revision 2," available at http://www.ietforg/rfc/rfc1350.txt, which is incorporated by reference herein. FIG. 6A presents a flowchart illustrating the process of a controller sending a command message, in accordance with an embodiment of the present invention. The controller can optionally receive an instruction for executing a command (operation 602). For example, a network administrator can instruct the controller to update a switch image of a group of switches and send the image to the corresponding switches. The controller obtains data associated with the command (operation 604). In some embodiments, the controller obtains such data from a local TFTP server, as described in conjunction with FIG. 1A. Referring to the previous example, such data can be a switch image. Depending on the maximum transmission unit (MTU) of the network, the controller puts the data in one or more message blocks (operation 606). The controller can assign a block number to a respective block to indicate the sequence of the block.

The controller then checks whether the command is associated with a logical group (operation 608). If so, then the controller identifies the multicast group associated with the logical group (operation 612) and sends the message blocks to the multicast group (operation 614). In some embodiments, the controller sends the message blocks in operation 614 using a modified multicast TFTP. In this modified TFTP, the recipients send negative acknowledgments for the missing blocks instead of acknowledgments for the received blocks. The controller then checks whether it has received any negative acknowledgment from a switch (operation 632). If so, the controller identifies the missing blocks for which a respective negative acknowledgment has been received (operation 634). If the command is not associated with a logical group, the controller identifies the switch associated with the command (operation 622). After identifying the switch associated with the command (operation 622) or the switch from which the negative acknowledgment has been received (operation 634), the controller starts a timer for the (missing) message blocks (operation 624) and sends the message blocks to the switch as unicast messages (operation 626). The controller then checks whether acknowledgment for the messages has been received on time, i.e., within the timer period (operation 628). If not, then the controller restarts the timer (operation 624) and retransmits the messages (operation 626). In this way, the number of control messages is reduced, and the controller only retransmits the missing blocks to the corresponding switches. In some embodiments, the controller stores the states of a respective command in the client database. For example, the controller can store the information about the sent and missing blocks in the client database.

Figure 6B:
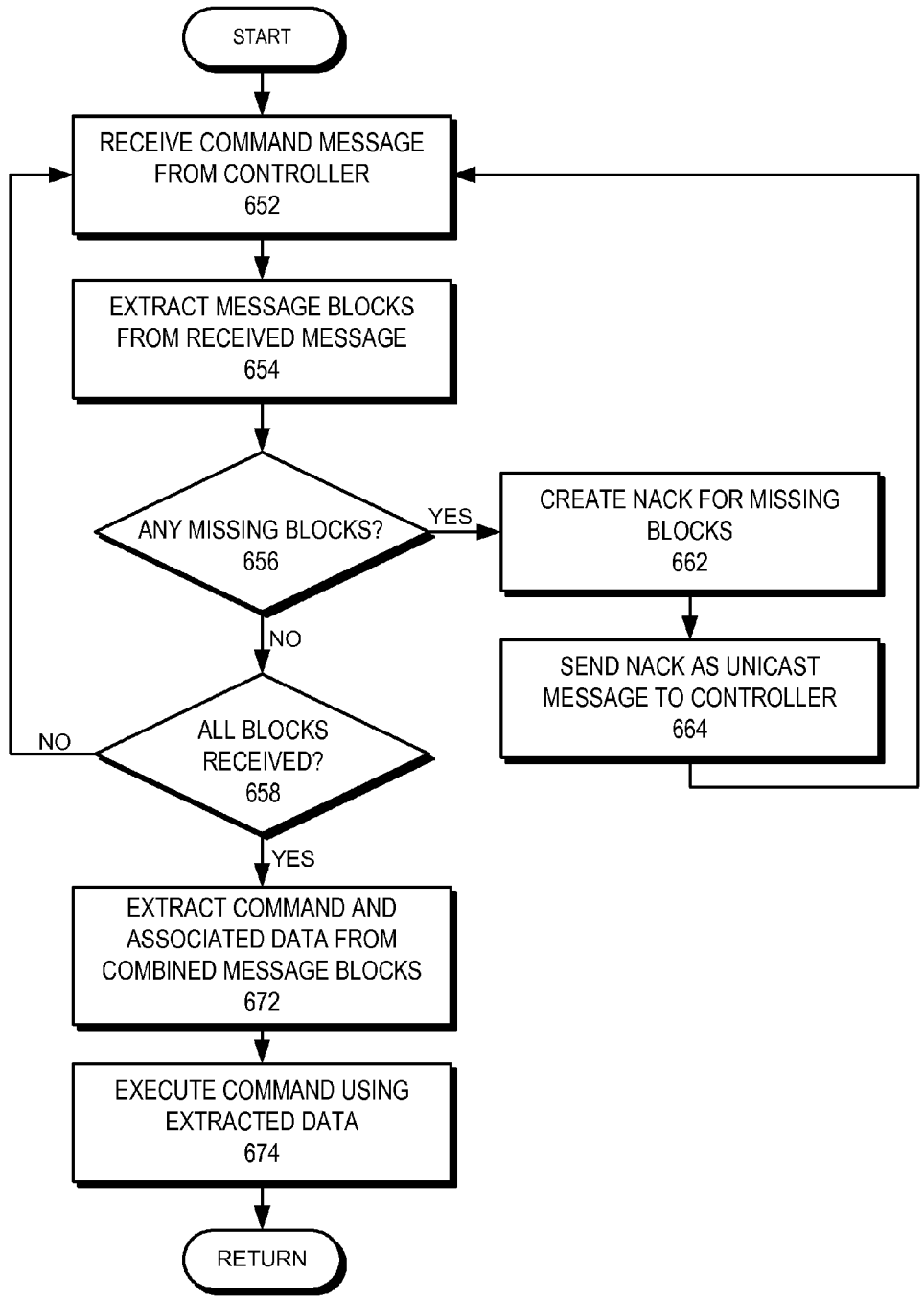
FIG. 6B presents a flowchart illustrating the process of a switch receiving a command message and executing the command, in accordance with an embodiment of the present invention.

FIG. 6B presents a flowchart illustrating the process of a switch receiving a command message and executing the command, in accordance with an embodiment of the present invention. Upon receiving a command message from the controller (operation 652), the switch extracts message blocks from the received message (operation 654). The switch then checks whether there are any missing blocks (operation 656). The switch can examine a block number associated with a respective block to determine whether any block is missing. If there are missing blocks, the switch creates a negative acknowledgment for the missing blocks (operation 662) and sends the negative acknowledgment to the controller as a unicast message (operation 664). In some embodiments, a respective message block has a sequence number. A series of such blocks is identified by a corresponding series of sequence numbers. The switch identifies a missing block when the switch identifies the corresponding missing sequence number. The switch includes this missing sequence number in the negative acknowledgment.

If there is no missing block, the switch checks whether all blocks have been received (operation 658). The switch can determine this by examining a flag in the received message. If all blocks have been received, the switch extracts the command and the data associated with the command from the combined message blocks (operation 672) and executes the command using the extracted data (operation 674). For example, if the command is for installing a new image on the switch, the combined message blocks contain the corresponding switch image. After receiving all blocks, the switch installs the switch image.

License Management

Typically in a network, switches come with some basic functionality. Other functionalities can be incrementally enabled by downloading a license, such as using specific routing protocols or enabling additional interfaces. The license is specific to a switch and uses an identifier of the switch as a tracking mechanism. Such an identifier can be a device serial number of the switch. The license is enabled by downloading a file which contains a key tied to the switch. A controller downloads the license file from a license server (can be referred to as a license portal), stores the license file in a local TFTP server, and sends the file to the corresponding switch. The controller can manage a diverse group of switches requiring diverse license files. A local TFTP server can store such diverse files and be used by multiple controllers in the network. In this way, a respective does not need to store the license files in local memory. Once the switch receives and stores the file, the other functionalities can be enabled.

A network administrator can instruct and configure a controller to obtain the license for the group of switches and send the license to the corresponding switches. Through the discovery process, the controller identifies the identifier of a respective switch of the group. The deployment of license to these switches is automated once the discovery process is complete. The controller sends the corresponding license files to the respective switch via unicast without any intervention from the network administrator.

Figure 7A:
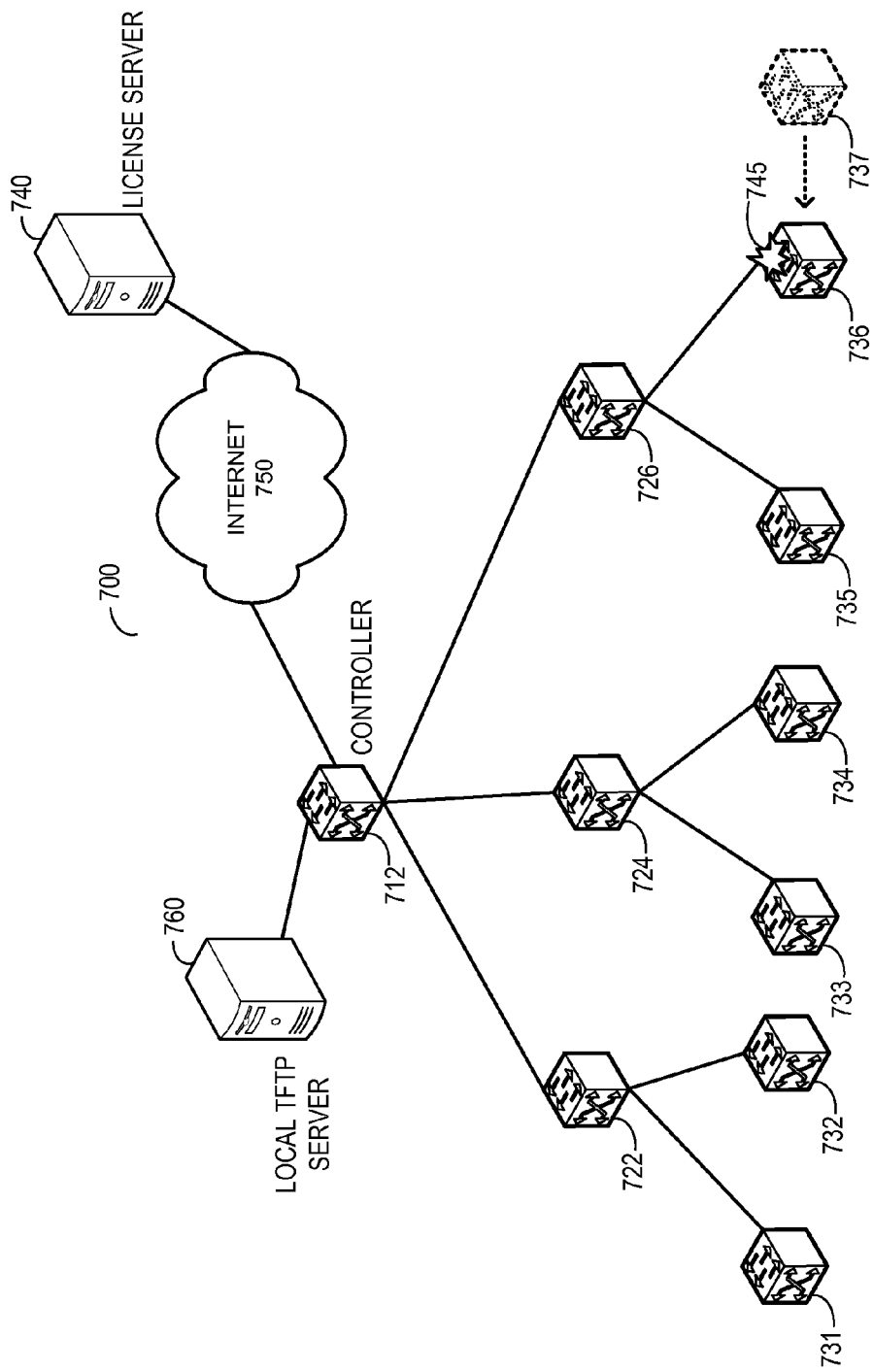
FIG. 7A illustrates an exemplary network with a controller coupled to a license server, in accordance with an embodiment of the present invention.

FIG. 7A illustrates an exemplary network with a controller coupled to a license server, in accordance with an embodiment of the present invention. As illustrated in FIG. 7A, a layer-2 network 700 has switches 722, 724, 726, 731, 732, 733, 734, 735, and 736. Also included in network 700 is a controller 712 which manages and configures the switches in network 700. Controller 712 can be a switch as well. Controller 712 is coupled to a license server 740 via Internet 750. Controller 712 automatically obtains licenses for switches using information stored in the client database. In some embodiments, controller 712 is coupled to a local TFTP server 760 which can store license files. TFTP server 760 can be beneficial to license management because TFTP server 760 is typically closer to controller 712 than license server 740 and can be used by multiple controllers.

A network administrator can specify a list of switches in network 700 with their respective license information. For example, the network administrator can specify license information for switches 722, 734, and 736. Controller 712 obtains license files for these switches from license server 740 and stores these license files in TFTP server 760. Based on the information in the client database, controller 712 sends license files to switches 722, 734, and 736 via unicast messages. In this way, a respective switch can automatically get the license from controller 712. Furthermore, if a switch fails and is replaced, controller 712 can transfer such license-specific information to the replaced switch. For example, suppose that failure 745 occurs that fails switch 736 and switch 737 replaces switch 736. Switch 737 is automatically discovered by controller 712. Upon discovering switch 737, controller 712 automatically transmits the license information to specific switch.

Figure 7B:
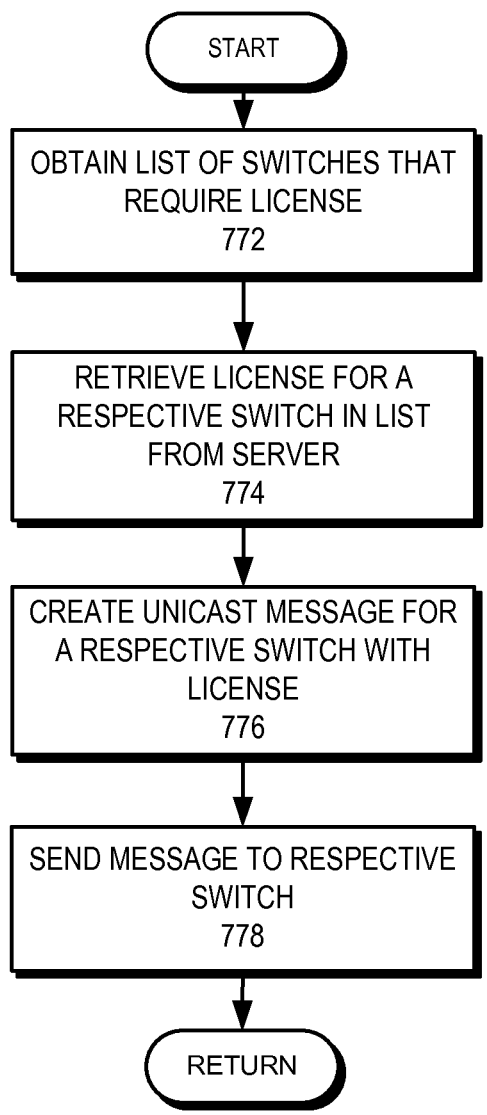
FIG. 7B presents a flowchart illustrating the process of a controller obtaining and providing licenses to one or more switches, in accordance with an embodiment of the present invention.

FIG. 7B presents a flowchart illustrating the process of a controller obtaining and providing licenses to one or more switches, in accordance with an embodiment of the present invention. The controller obtains a list of switches that require a license (operation 772). The controller can obtain the list from a network administrator. The controller then obtains a license file for a respective switch in the list from a license server (operation 774) and creates a unicast message for the switch with the license (operation 776). The controller then sends a unicast message to the switch (operation 778), as described in conjunction with FIG. 6A.

Failed Switch Replacement

Figure 8A:
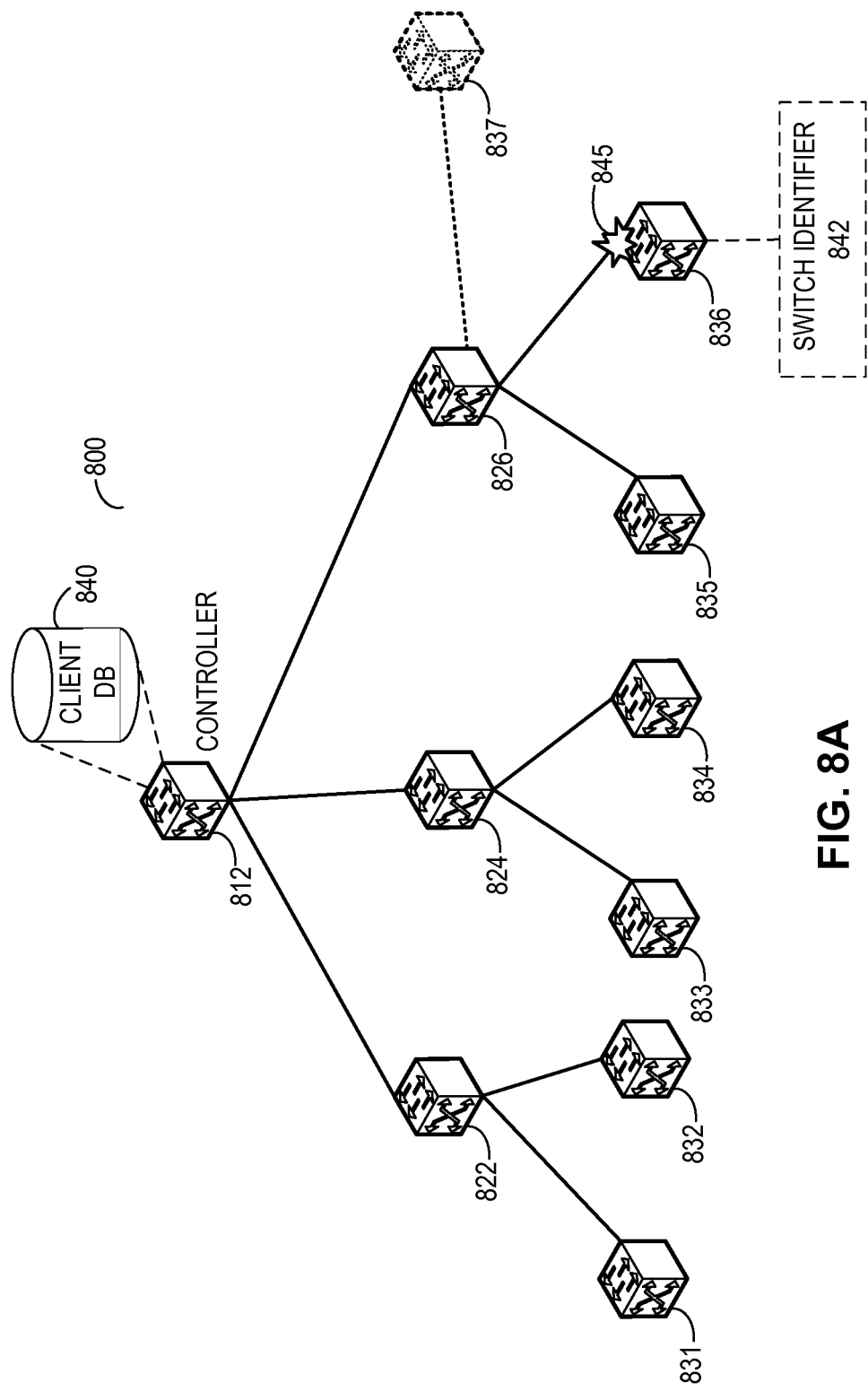
FIG. 8A illustrates an exemplary network with a replacement switch, in accordance with an embodiment of the present invention.

During operation, a switch may fail due to many different reasons (e.g., corrupted flush memory). When a switch fails, based on the replacement arrangement, a network administrator replaces the failed switch with a new replacement switch. As a result of the discovery process, the configuration and the license information can be transferred to the replaced device. Because the controller of the network already contains all the switch-specific discovery information of the failed switch (e.g., the switch image), the network administrator can instruct the controller to apply the configuration of the failed switch from the client database to the replacement switch. FIG. 8A illustrates an exemplary network with a replacement switch, in accordance with an embodiment of the present invention. In this example, a network 800 has switches 822, 824, 826, 831, 832, 833, 834, 835, and 836. Also included in network 800 is a controller 812 which manages and configures the switches in network 800. Controller 812 can be a switch as well. During operation, controller 812 discovers and configures a respective switch in network 800 and stores the discovery information of the switch in a client database 840. For example, upon discovery, controller discovers identifier 842 of switch 836. Switch identifier 842 can be a serial number of switch 836.

Suppose that failure 845 occurs which fails switch 836 and disconnects it from network 800. Consequently, switch 836 does not receive the periodic message from controller 812 and does not send a response back to controller 812. When controller 812 does not receive the response for a period of time, controller 812 ages-out the entry corresponding to switch 836 in client database 840. Based on the replacement arrangement, a network administrator replaces failed switch 836 with a new replacement switch 837. Controller 812 discovers switch 837 as a new switch and learns the identifier of switch 837. The network administrator ties the entry corresponding to failed switch 836 in client database 840 to switch 837 by specifying the identifiers of these switches. Controller 812 recognizes switch 837 as a replacement switch based on the specified identifier. Because a license is specific to a switch and tied to its identifier, controller 812 obtains a new license for switch 837 from the license server. Controller 812 then sends the license to switch 837, as described in conjunction with FIG. 7B. After the discovery, controller sends configuration, switch image, and group information to switch 837. In this way, the network administrator does not have to configure replacement switch 837 and controller can automatically configure switch 837 with the configuration of failed switch 836.

Figure 8B:
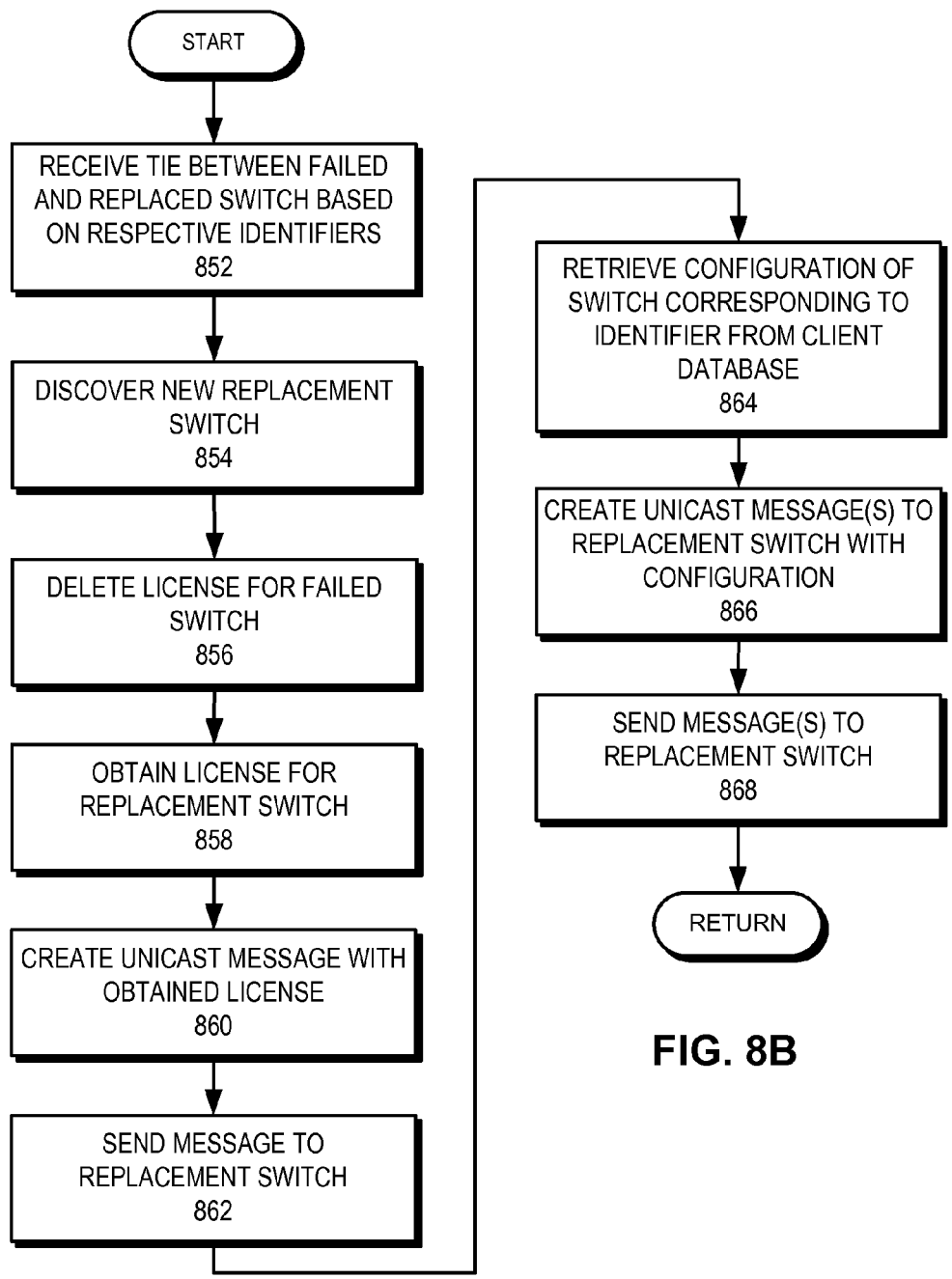
FIG. 8B presents a flowchart illustrating the process of a controller configuring a replacement switch, in accordance with an embodiment of the present invention.

FIG. 8B presents a flowchart illustrating the process of a controller configuring a replacement switch, in accordance with an embodiment of the present invention. The controller receives a tie between the failed and the replaced switch based in identifiers of these two switches (operation 852). A network administrator usually provides the controller with the tie. The controller discovers the replacement switch (operation 854), as described in conjunction with FIG. 2A. The controller then deletes the license for the failed switch (operation 856) and obtains a license for the replacement switch (operation 858). The switch creates a unicast message with the obtained license (operation 860) and sends the message to the replacement switch (operation 862). The controller retrieves the configuration associated with the identifier of the failed switch from the client database (operation 856). The switch creates unicast messages with the retrieved configuration for the replacement switch (operation 858) and sends the unicast messages to the replacement switch (operation 860), as described in conjunction with FIG. 6A. When the replacement switch receives the configuration, the switch installs the received configuration, as described in conjunction with FIG. 6B.

Exemplary Switch System

Figure 9:
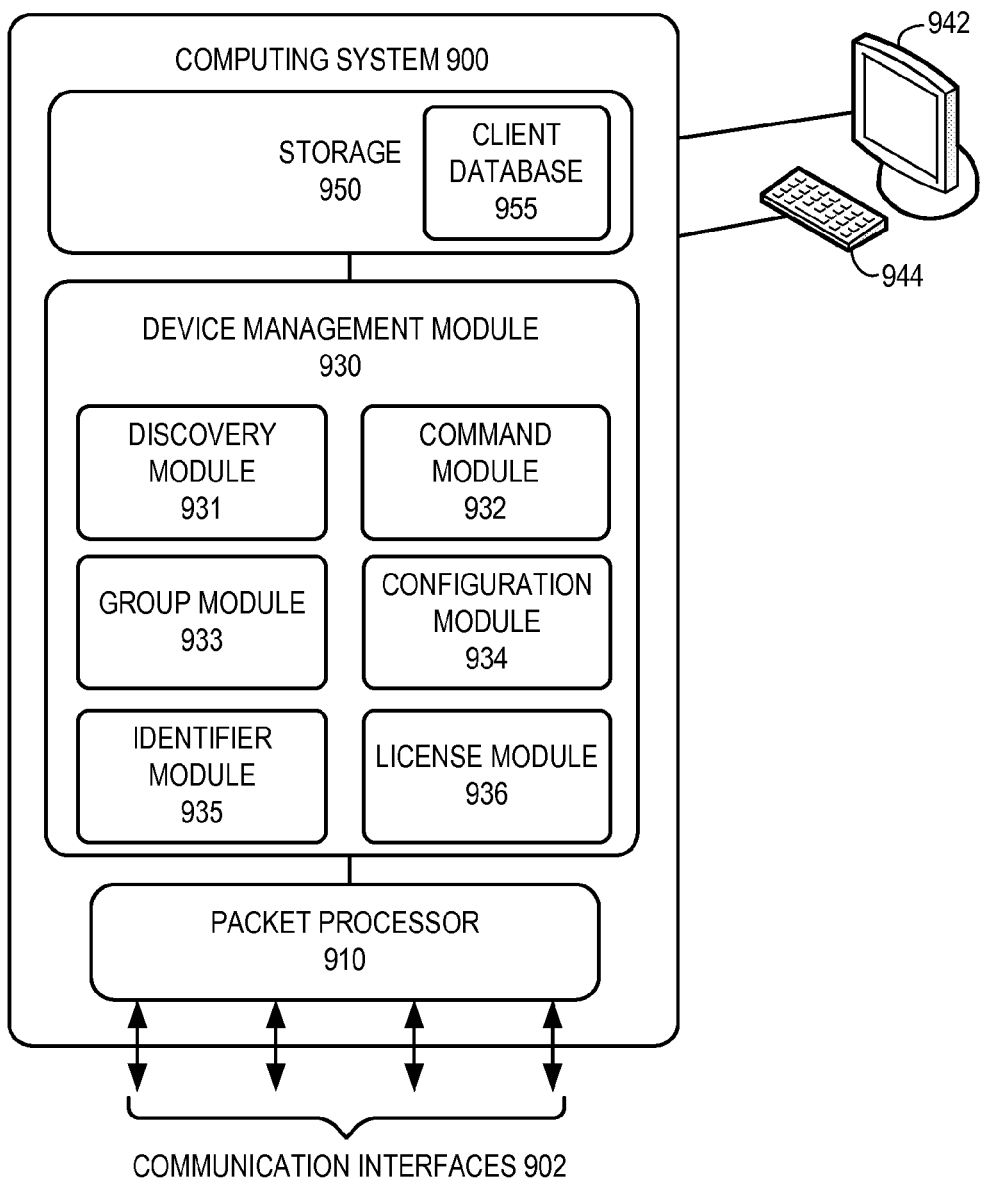
FIG. 9 illustrates an exemplary computing system, in accordance with an embodiment of the present invention.

FIG. 9 illustrates an exemplary switch, in accordance with an embodiment of the present invention. In this example, a computing system 900 includes a number of communication interfaces 902, a device management module 930, a packet processor 910, and a storage 950. Packet processor 910 extracts and processes header information from the received frames. Computing system 900 is registered to a multicast group. The switch can optionally be coupled to a display device 942 and an input device 944. During operation, discovery module 931 periodically sends discovery messages in conjunction with packet processor 910 via communication interfaces 902 to the default multicast group.

Upon receiving a response to a discovery message from a remote switch via one of the communication interfaces 902, packet processor 910 hands the payload of the message to device management module 930. Device management module 930 extracts the content of the response and stores the information in a client database 955 in storage 950. Identifier module 935 assigns a unique identifier to the remote switch and sends the identifier to the remote switch in conjunction with packet processor 910.

Command module 932 identifies any command to be executed by the remote switch. If the command is for a plurality of remote switches with one or more common attributes, group module 933 creates a logical group for the remote switches and notifies the remote switches, as described in conjunction with FIG. 5A. Command module 932 then sends the command and associated data to the remote switch, as described in conjunction with FIG. 6A. If the remote switch requires a new switch image or configuration, configuration module 934 creates the corresponding switch image or configuration, and sends it to the remote switch in conjunction with packet processor 910. License module 936 obtains a list of switches requiring a license via input device 944, retrieves the license for a respective switch, and sends it to the remote switch in conjunction with packet processor 910, as described in conjunction with FIG. 7B.

Note that the above-mentioned modules can be implemented in hardware as well as in software. In one embodiment, these modules can be embodied in computer-executable instructions stored in a memory which is coupled to one or more processors in computing system 900. When executed, these instructions cause the processor(s) to perform the aforementioned functions.

In summary, embodiments of the present invention provide a switch, a method and a computing system for efficiently managing a plurality of interconnected switches. The computing system includes a discovery mechanism, a device management mechanism, and a logical group management mechanism.

The discovery mechanism constructs a multicast query message for a first multicast group to which the computing system is registered. The device management mechanism extracts information about a remote switch from a query response message from the remote switch and constructs a client database, wherein a first entry in the client database contains the information extracted from the query response message. The logical group management mechanism associates the remote switch with a second multicast group. In another embodiment, the switch includes a packet processor, a discovery mechanism, and a command management mechanism. The packet processor extracts the content of a message from a remote switch. The discovery mechanism constructs a multicast query response message for a first multicast group in response to the extracted content being a multicast query. The command management mechanism locally executes a command received in the switch, wherein the extracted content contains the command.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed.

When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computing system, comprising:
a processor; and
a non-transitory computer-readable storage medium storing instructions which when executed by the processor causes the processor to perform a method, the method comprising:
constructing a query message destined for a first multicast group to which the computing system is registered, wherein a multicast group includes one or more devices registered to the multicast group, wherein the query is a multicast message, and wherein a multicast group is associated with a multicast distribution tree via which a multicast message destined for the multicast group is distributed;
extracting discovery information associated with a remote switch from a query response message; and
constructing a client database, wherein a first entry in the client database includes the discovery information extracted from the query response message; and
associating the remote switch with a second multicast group based on an attribute from the first entry, wherein the attribute is in the discovery information.

2. The computing system of claim 1, wherein the method further comprises constructing an instruction message instructing a local switch to construct the query message.

3. The computing system of claim 1, wherein at least one interface of the computing system and at least one interface of the remote switch are associated with an identifier of a virtual local area network (VLAN), and wherein a respective member of the VLAN is registered to the first multicast group.

4. The computing system of claim 1, wherein the method further comprises assigning a unique identifier to the remote switch.

5. The computing system of claim 4, wherein the unique identifier is an Internet Protocol (IP) address, and wherein the IP address is internal to a network comprising the computing system and the remote switch.

6. The computing system of claim 1, wherein the method further comprises constructing a message comprising a command to be executed on the remote switch.

7. The computing system of claim 6, wherein the command is in a type-length-value (TLV) format.

8. The computing system of claim 1, wherein the method further comprises:
creating a switch configuration for the remote switch; and
constructing a first data message destined for the second multicast group, wherein the first data message comprises at least a portion of the switch configuration, and wherein the first data message is a multicast message.

9. The computing system of claim 8, wherein the switch configuration is a switch image, and wherein the switch image specifies operations and forwarding policies for the remote switch.

10. The computing system of claim 8, wherein the method further comprises constructing a second data message destined for the remote switch in response to identifying a negative acknowledgment for the first data message, wherein the second data message is a unicast message.

11. The computing system of claim 1, wherein the method further comprises constructing a message comprising license information for the remote switch.

12. A switch, comprising:
one or more ports;
a packet processing circuitry configured to extract content of a message received via one of the ports;
discovery circuitry configured to construct a query response message destined for a first multicast group in response to the extracted content being a multicast query, wherein a multicast group includes one or more devices registered to the multicast group, wherein the query is a multicast message, and wherein a multicast group is associated with a multicast distribution tree via which a multicast message destined for the multicast group is distributed; and
command circuitry configured to locally execute a command in the switch, wherein the extracted content includes the command.

13. The switch of claim 12, further comprising
an identifier management circuitry configured to assign a unique identifier to the switch, wherein the extracted content includes the unique identifier.

14. The switch of claim 12, further comprising a switch configuration circuitry configured to configure the switch based on a switch configuration, wherein the extracted content comprises at least a portion of the switch configuration.

15. The switch of claim 14, wherein the switch configuration is a switch image, and wherein the switch image specifies operations and forwarding policies for the switch.

16. The switch of claim 12, wherein the packet processing circuitry is further configured to construct a unicast message for a remote computing device, wherein the message comprises respective negative acknowledgments for one or more missing messages.

17. A method executed by a computing system, comprising:
constructing a query message destined for a first multicast group to which the computing system is registered, wherein a multicast group is associated with one or more devices registered to the multicast group, wherein the query is a multicast message, and wherein a multicast group is associated with a multicast distribution tree via which a multicast message destined for the multicast group is distributed;
extracting discovery information associated with a remote switch from a query response message;
constructing a client database, wherein a first entry in the client database includes the discovery information extracted from the query response message; and
associating the remote switch with a second multicast group based on an attribute from the first entry, wherein the attribute is in the discovery information.

18. The method of claim 17, further comprising constructing an instruction message instructing a local switch to construct the query message.

19. The method of claim 17, wherein at least one interface of the computing system and at least one interface of the remote switch are configured with an identifier of a virtual local area network (VLAN), and wherein a respective member of the VLAN is registered to the first multicast group.

20. The method of claim 17, further comprising assigning a unique identifier to the remote switch.

21. The method of claim 20, wherein the unique identifier is an Internet Protocol (IP) address, and wherein the IP address is internal to a network comprising the computing system and the remote switch.

22. The method of claim 17, further comprising constructing a message comprising a command to be executed on the remote switch.

23. The method of claim 22, wherein the command is in a type-length-value (TLV) format.

24. The method of claim 17, further comprising:
creating a switch configuration for the remote switch; and
constructing a first data message for the second multicast group, wherein the first data message comprises at least a portion of the switch configuration, and wherein the first data message is a multicast message.

25. The method of claim 24, wherein the switch configuration is a switch image, and wherein the switch image specifies operations and forwarding policies for the remote switch.

26. The method of claim 24, further comprising constructing a second message for the remote switch in response to identifying a negative acknowledgment for the first data message, and wherein the second data message is a unicast message.

27. The method of claim 17, further comprising constructing a message comprising license information for the remote switch.

28. A non-transitory computer-readable storage medium storing instructions that when executed by a computer cause the computer to perform a method, the method, comprising:
extracting content of a message received via a port of a switch;
constructing a query response message destined for a first multicast group in response to the extracted content being a multicast query, wherein a multicast group includes one or more devices registered to the multicast group, wherein the query is a multicast message, and wherein a multicast group is associated with a multicast distribution tree via which a multicast message destined for the multicast group is distributed; and
locally executing a command in the switch, wherein the extracted content includes the command.

* * * * *